(12) United States Patent
Oda et al.

(10) Patent No.: US 10,114,623 B2
(45) Date of Patent: Oct. 30, 2018

(54) MACHINE SYSTEM, MACHINE CONTROL COMPUTER, BASE SOFTWARE APPLICATION, COMPUTER-READABLE RECORDING MEDIUM, AND MACHINE CONTROL METHOD FOR INTERCOMMUNICATION WITH MACHINES

(71) Applicant: FANUC CORPORATION, Yamanashi (JP)

(72) Inventors: Masaru Oda, Yamanashi (JP); Kiyonori Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 73 days.

(21) Appl. No.: 15/444,288

(22) Filed: Feb. 27, 2017

(65) Prior Publication Data

US 2017/0248929 A1 Aug. 31, 2017

(30) Foreign Application Priority Data

Feb. 29, 2016 (JP) .................................. 2016-037956
Dec. 28, 2016 (JP) .................................. 2016-256941

(51) Int. Cl.
*G06F 8/40* (2018.01)
*G06F 8/76* (2018.01)
(Continued)

(52) U.S. Cl.
CPC ........... *G06F 8/40* (2013.01); *G05B 19/0426* (2013.01); *G05B 19/4083* (2013.01); *G06F 8/51* (2013.01);
(Continued)

(58) Field of Classification Search
CPC ..... G06F 8/40; G06F 8/51; G06F 8/70; G06F 8/76; G05B 19/0426; G05B 19/4083;
(Continued)

(56) References Cited

U.S. PATENT DOCUMENTS

| 2006/0206877 | A1* | 9/2006 | Kohlmeier | .............. G06F 9/454 717/137 |
| 2010/0257507 | A1* | 10/2010 | Warren | ..................... G06F 8/40 717/106 |
| 2012/0095973 | A1* | 4/2012 | Kehoe | ...................... G06F 8/70 707/694 |

FOREIGN PATENT DOCUMENTS

| JP | 63-77685 A | 4/1988 |
| JP | 2-213905 A | 8/1990 |

(Continued)

*Primary Examiner* — Qing Chen
(74) *Attorney, Agent, or Firm* — Hauptman Ham, LLP

(57) ABSTRACT

A machine system includes two machines, a computer communicably connected to the machines, and a base software application and an operation software application installed in the computer. The base software application includes a first communication module that is a program portion to execute transmission and reception of first machine information to be outputted from each machine and second command information to be outputted to each machine, and a second communication module that is a program portion to execute transmission and reception of first command information to be inputted from the operation software application to the base software application and second machine information to be outputted from the base software application to the operation software application.

45 Claims, 4 Drawing Sheets

(51) Int. Cl.
  *G06F 8/70*   (2018.01)
  *G06F 8/51*   (2018.01)
  *G05B 19/042*  (2006.01)
  *G05B 19/408*  (2006.01)
  *G05B 19/418*  (2006.01)

(52) U.S. Cl.
  CPC ............... *G06F 8/70* (2013.01); *G06F 8/76* (2013.01); *G05B 19/41845* (2013.01); *G05B 2219/35565* (2013.01); *Y02P 90/12* (2015.11); *Y02P 90/16* (2015.11)

(58) Field of Classification Search
  CPC .... G05B 19/41845; G05B 2219/35565; Y02P 90/12; Y02P 90/16
  USPC .............................. 717/120–123, 136, 137
  See application file for complete search history.

(56) References Cited

FOREIGN PATENT DOCUMENTS

| | | |
|---|---|---|
| JP | 7-56618 | 3/1995 |
| JP | 2004-62276 A | 2/2004 |
| JP | 2004-246859 A | 9/2004 |
| JP | 2015-156182 A | 8/2015 |
| WO | 2007/105298 A1 | 9/2007 |

\* cited by examiner

MACHINE SYSTEM, MACHINE CONTROL COMPUTER, BASE SOFTWARE APPLICATION, COMPUTER-READABLE RECORDING MEDIUM, AND MACHINE CONTROL METHOD FOR INTERCOMMUNICATION WITH MACHINES

RELATED APPLICATIONS

The present application claims priority to Japanese Patent Applications Nos. 2016-037956 filed Feb. 29, 2016 and 2016-256941 filed Dec. 28, 2016, the disclosures of which is hereby incorporated by reference herein in their entirety.

BACKGROUND OF THE INVENTION

1. Field of the Invention

The present invention relates to a machine system, a machine control computer, a base software application, a computer-readable recording medium, and a machine control method for establishing intercommunication with a plurality of machines.

2. Description of Related Art

Conventionally, production planning systems make production plans about products to be produced, the number of the products, delivery dates, machines to be used, production processes, etc. Based on the production plans made by the production planning systems, operators operate machine tools, industrial robots, etc., in production sites. The operators of the production sites transmit machine operation information, actual production data, etc., to the production planning systems to perform quality control, process control, etc.

For example, there is a method in which process information is made from a product item object and an operation object, and assignment information is made from the process information and a resource object (for example, refer to WO/2007/105298).

Also, there is a method in which device information on a machine tool or a measurement instrument is periodically collected at established intervals. The collected device information is stored in a database in association with collection times, and sent to an external device (for example, refer to Japanese Unexamined Patent Publication (Kokai) No. 2004-62276).

In recent years, the diversification of market needs, short product life cycles, and intensified competition in a global market cause an increase in the variety of products and an increase in sales fluctuations. Accordingly, it is required to produce a wide variety and various numbers of products, in order to produce the products dynamically in tandem with the market needs.

Thus, cellular manufacturing in which a plurality of machines are integrated into one production cell, and production is performed on a process-by-process basis in units of the production cells is proposed. According to the cellular manufacturing, the single production cell can produce a plurality of types of products. The number of the production cells can be increased or decreased in accordance with product quantity. The layout of the production cell can be changed depending on a change of the types of products to be produced.

Furthermore, cell control systems each of which controls a plurality of machines installed in a production site through an intranet, while receiving a production plan command from the production planning system over the Internet, are developed. The cell control systems are expected to operate the machines by the command from the production planning system situated in a place away from the production site and to automatically collect and collectively manage various types of information from each machine in real time.

In the above cell control systems, a specific operation software application is installed into the cell control system to establish intercommunication between each machine and the cell control system and to perform the operation of each machine. In this case, information is required to be transmitted and received among a base software application of the cell control system, the operation software application, and each machine. At this time, it is also required to manage the operation software application installed in the cell control system.

SUMMARY OF THE INVENTION

The present invention provides a machine system that can transmit and receive information among a base software application, an operation software application, and each machine and manage the transmission and reception of the information.

One aspect of the disclosure may be a machine system that includes a machine and a machine control computer communicably connected to the machine. A base software application and an operation software application are installed in the computer.

The base software application includes:
a first communication module that is a program portion to enable the computer to receive first machine information in a machine-specific data format outputted from the machine;
a second communication module that is a program portion to enable the computer to output second machine information in an operation software application-specific data format to the operation software application;
a program portion for storing the first machine information and the second machine information in a memory unit included in the computer; and
a program portion for enabling the computer to convert the first machine information into the second machine information.

The machine has the function of outputting the state of the machine to the computer as the first machine information. The operation software application is a program using the second machine information outputted from the second communication module as input information.

Another aspect may be a machine system that includes at least two machines and a machine control computer communicably connected to the machines. A base software application and an operation software application are installed in the computer.

The base software application includes:
a first communication module that is a program portion to enable the computer to receive first machine information in a machine-specific data format outputted from each machine in association with identification information of each machine;
a second communication module that is a program portion to enable the computer to output second machine information in an operation software application-specific data format to the operation software application in association with the identification information of each machine;
a program portion for storing the first machine information and the second machine information in a memory unit included in the computer in association with the identification information of each machine; and a program portion for enabling the computer to convert the first machine information into the second machine information.

Each machine has the function of outputting the state of the machine to the computer as the first machine information in association with the identification information of the machine.

The operation software application is a program using the second machine information outputted from the second communication module as input information.

Another aspect may be a machine system that includes a machine and a machine control computer communicably connected to the machine. A base software application and an operation software application are installed in the computer.

The base software application includes:

a first communication module that is a program portion to enable the computer to receive first machine information in a machine-specific data format outputted from the machine and transmit second command information in the machine-specific data format to the machine;

a second communication module that is a program portion to enable the computer to input first command information in an operation software application-specific data format from the operation software application and output second machine information in the operation software application-specific data format to the operation software application;

a program portion for storing the first machine information, the second machine information, the first command information, and the second command information in a memory unit included in the computer;

a program portion for enabling the computer to convert the first machine information into the second machine information; and a program portion for enabling the computer to convert the first command information into the second command information.

The machine has the functions of outputting the state of the machine to the computer as the first machine information and determining an operation to be performed by the machine based on the second command information.

The operation software application is a program to enable the computer to generate the first command information for the machine based on the second machine information inputted from the second communication module, and output the first command information to the second communication module.

Another aspect may be a machine control computer communicably connected to a machine. A base software application and an operation software application are installed in the computer.

The base software application includes:

a first communication module that is a program portion to enable the computer to receive first machine information in a machine-specific data format outputted from the machine;

a second communication module that is a program portion to enable the computer to output second machine information in an operation software application-specific data format to the operation software application;

a program portion for storing the first machine information and the second machine information in a memory unit included in the computer; and a program portion for enabling the computer to convert the first machine information into the second machine information.

The operation software application is a program using the second machine information outputted from the second communication module as input information.

Another aspect may be a machine control computer communicably connected to at least two machines. A base software application and an operation software application are installed in the computer.

The base software application includes:

a first communication module that is a program portion to enable the computer to receive first machine information in a machine-specific data format outputted from each machine in association with identification information of each machine;

a second communication module that is a program portion to enable the computer to output second machine information in an operation software application-specific data format to the operation software application in association with the identification information of each machine;

a program portion for storing the first machine information and the second machine information in a memory unit included in the computer in association with the identification information of each machine; and a program portion for enabling the computer to convert the first machine information into the second machine information.

The operation software application is a program using the second machine information outputted from the second communication module as input information.

Another aspect may be a machine control computer communicably connected to a machine. A base software application and an operation software application are installed in the computer.

The base software application includes:

a first communication module that is a program portion to enable the computer to receive first machine information in a machine-specific data format outputted from the machine and transmit second command information in the machine-specific data format to the machine;

a second communication module that is a program portion to enable the computer to input first command information in an operation software application-specific data format from the operation software application, and output second machine information in the operation software application-specific data format to the operation software application;

a program portion for storing the first machine information, the second machine information, the first command information, and the second command information in a memory unit included in the computer;

a program portion for enabling the computer to convert the first machine information into the second machine information; and a program portion for enabling the computer to convert the first command information into the second command information.

The operation software application is a program to enable the computer to generate the first command information for the machine based on the second machine information inputted from the second communication module, and output the first command information to the second communication module.

Another aspect may be a base software application installed in a machine control computer communicably connected to a machine, together with an operation software application.

The base software application enables the computer to execute:

receiving first machine information in a machine-specific data format outputted from the machine to the computer;

converting the first machine information into second machine information in an operation software application-specific data format; and outputting the second machine information to the operation software application.

Another aspect may be a base software application installed in a machine control computer communicably connected to at least two machines, together with an operation software application.

The base software application enables the computer to execute:

receiving first machine information in a machine-specific data format outputted from each machine to the computer in association with identification information of each machine;

converting the first machine information into second machine information in an operation software application-specific data format; and outputting the second machine information to the operation software application in association with the identification information of each machine.

Another aspect may be a base software application installed in a machine control computer communicably connected to a machine, together with an operation software application.

The base software application enables the computer to execute:

receiving first machine information in a machine-specific data format outputted from the machine to the computer;

converting the first machine information into second machine information in an operation software application-specific data format;

outputting the second machine information to the operation software application;

receiving first command information in the operation software application-specific data format from the operation software application;

converting the first command information into second command information in the machine-specific data format; and outputting the second command information to the machine.

Another aspect may be a machine control method for controlling at least one machine by a machine control computer in which a base software application and an operation software application are installed. The machine control method includes the steps of:

by the computer, receiving first machine information in a machine-specific data format outputted from the machine to indicate the state of the machine, converting the first machine information into second machine information in an operation software application-specific data format according to the base software application, and outputting the second machine information to the operation software application; and by the computer, executing the operation software application that uses the second machine information as input information.

Another aspect may be a machine control method for controlling at least one machine by a machine control computer in which a base software application and an operation software application are installed. The machine control method includes the steps of:

by the computer, receiving first machine information in a machine-specific data format outputted from the machine to indicate the state of the machine, converting the first machine information into second machine information in an operation software application-specific data format according to the base software application, and outputting the second machine information to the operation software application; and by the computer, generating first command information in the operation software application-specific data format based on the second machine information according to the operation software application, converting the first command information into second command information in the machine-specific data format according to the base software application, and transmitting the second command information to the machine.

BRIEF DESCRIPTION OF THE DRAWINGS

The objects, features, and advantages of the present invention and other objects, features, and advantages thereof will be more apparent from the following detailed description of a typical embodiment of the present invention shown in the attached drawing, wherein.

DETAILED DESCRIPTION OF THE INVENTION

Figure 1:
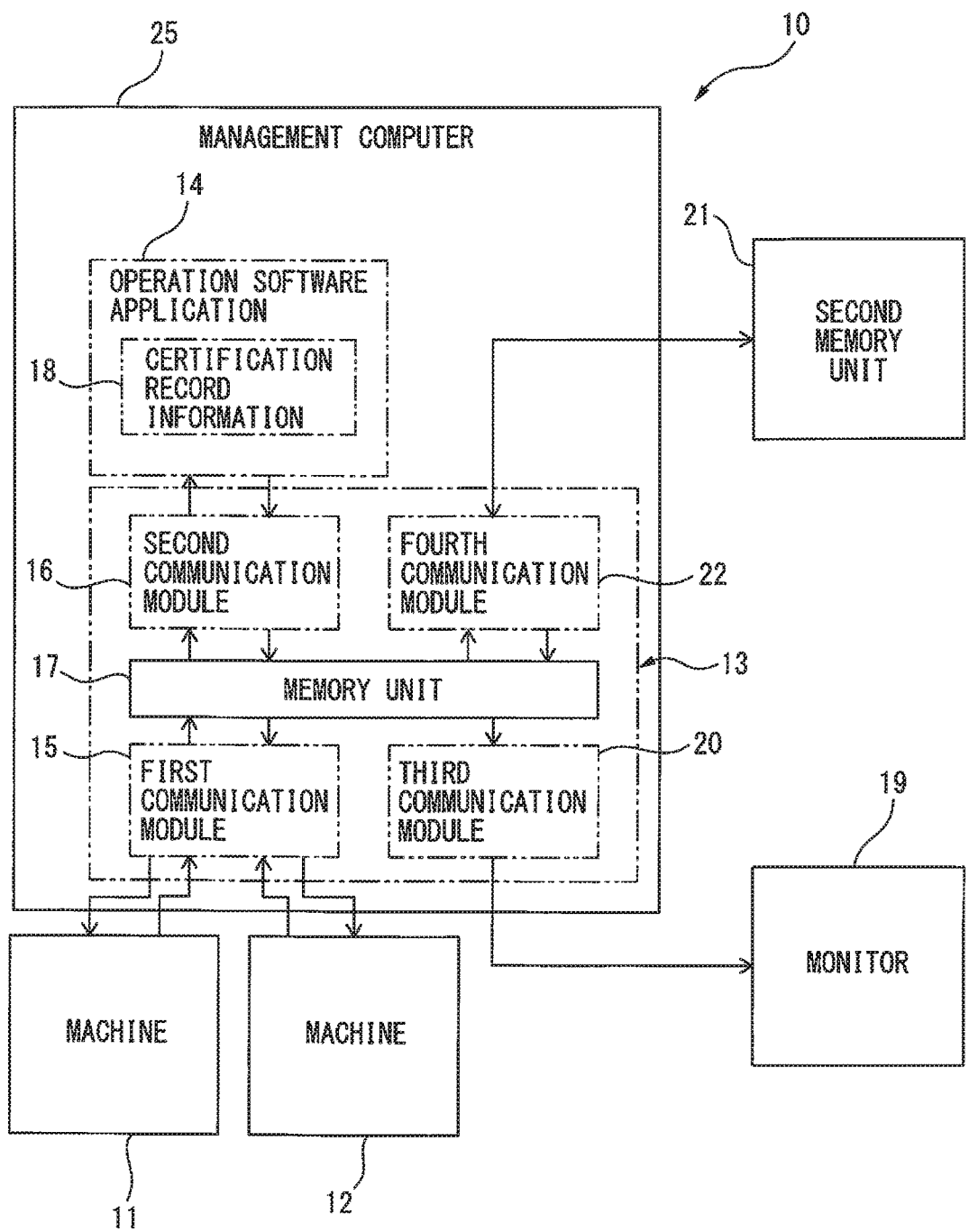
FIG. 1 is a schematic diagram of the configuration of a machine system according to an embodiment.

Next, an embodiment of the disclosure will be described with reference to the drawings. In the drawings, the same components and functional parts are indicated with the same reference numerals. For ease of understanding, the drawings are appropriately scaled up or down. The embodiment shown in the drawings is just an example to embody the present invention, and the present invention is not limited to the embodiment.

FIG. 1 is a schematic diagram showing the configuration of a machine system according to an embodiment.

Referring to FIG. 1, a machine system 10 according to the embodiment includes two machines 11 and 12 and a machine management personal computer (hereinafter abbreviated as management computer) communicably connected to the machines 11 and 12. A base software application 13 and an operation software application 14 are installed in the management computer 25. Although FIG. 1 includes the two machines 11 and 12, the number of machines is not limited in the present invention as long as there is at least one machine.

The base software application 13 includes a first communication module 15, which is a program portion to enable the management computer 25 to receive first machine information outputted from each machine 11 or 12 and transmit second command information to each machine 11 or 12. Furthermore, the base software application 13 includes a second communication module 16, which is a program portion to enable the management computer 25 to input first command information from the operation software applicationtion 14 and output second machine information to the operation software application 14. The base software application 13 also includes a program portion for storing the first machine information, the second machine information, the first command information, and the second command information in a memory unit 17 included in the management computer 25.

The first machine information and the second machine information are information indicating the states of the machines 11 and 12. The first command information and the second command information are information representing the contents of commands given to the machines 11 and 12. Concrete examples of the information will be described later.

Each machine 11 or 12 has the function of outputting the state of the machine 11 or 12 to the management computer 25 as the first machine information, and the function of determining an operation to be performed by the machine 11 or 12 based on the second command information. In other words, upon receiving the second command information, each machine 11 or 12 performs the operation corresponding to the contents of the second command information. The machines 11 and 12 are, for example, industrial robots, NC machine tools, or the like. Each machine 11 or 12 has a CPU, a ROM, a RAM, and a communication control unit (not shown) that controls information communication with the management computer 25.

Figure 2:
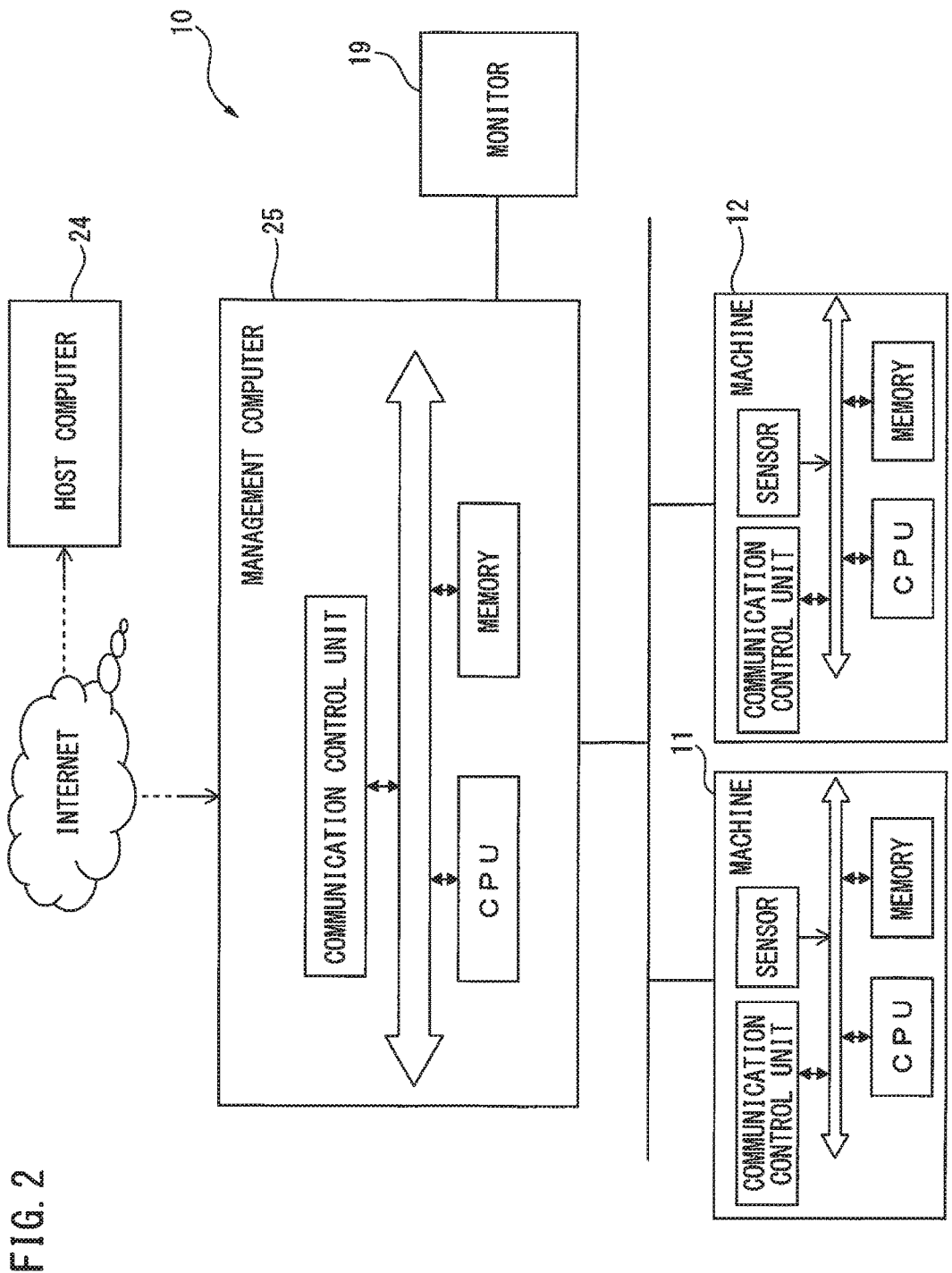
FIG. 2 is a drawing of hardware configurations of a management computer and machines shown in FIG. 1.

Furthermore, as shown in FIG. 2, the machines 11 and 12 and the management computer 25 are configured in a computer system including memories, CPUs (control processing units), communication control units, etc., connected through buses. The memories include ROMs (read only memories), RAMs (random access memories), etc. The base software application 13 and the operation software application 14 according to this embodiment are appropriately stored in the ROM or RAM of the management computer 25. The RAM is used as the memory unit 17 for storing the first machine information, the second machine information, the first command information, and the second command information. The first communication module 15 and the second communication module 16 are program portions (so-called modules) included in the base software application 13 stored in the ROM or RAM. To achieve the operations of the program portions, the CPU of the management computer 25 executes the base software application 13 and the operation software application 14. Furthermore, the operation software application 14 is a program that enables the management computer 25 to generate the first command information for each machine 11 or 12 based on the second machine information inputted from the second communication module 16 and output the first command information to the second communication module 16.

More specifically, in this embodiment, the first communication module 15 is preferably a program portion that enables the management computer 25 to receive the first machine information outputted from each machine 11 or 12 in association with identification information of each machine 11 or 12, and transmit the second command information to each machine 11 or 12. The second communication module 16 is preferably a program portion that enables the management computer 25 to input the first command information from the operation software application 14 in association with the identification information of each machine 11 or 12, and output the second machine information to each machine 11 or 12 in association with the identification information of each machine 11 or 12. The identification information of each machine 11 or 12 is, for example, an identification number assigned to each machine.

The memory unit 17 preferably stores the first machine information, the second machine information, the first command information, and the second command information in association with the identification information of each machine 11 or 12.

Each machine 11 or 12 preferably transmits the state of the machine 11 or 12 to the management computer 25 as the first machine information in association with the identification information of each machine 11 or 12, and determines an operation to be performed by the machine 11 or 12 based on the second command information.

The operation software application 14 is preferably a program that enables the management computer 25 to generate the first command information for each machine 11 or 12 based on the second machine information inputted from the second communication module 16 in association with the identification information of each machine 11 or 12, and output the first command information to the second communication module 16 in association with the identification information of each machine 11 or 12.

In the embodiment shown in FIG. 1, the management computer 25 receives the first machine information outputted from each machine 11 or 12 to indicate the state of the machine. The management computer 25 converts the first machine information into the second machine information by the base software application 13, and outputs the second machine information of each machine 11 or 12 to the operation software application 14. After that, the management computer 25 generates the first command information based on the second machine information by the operation software application 14. The management computer 25 converts the first command information into the second command information by the base software application 13, and transmits the second command information to each machine 11 or 12.

In this embodiment, however, the transmissions of the first command information and the second command information, as described above, are not indispensable. The operation software application 14 may be a program that uses the second machine information outputted from the second communication module 16 as input information, for example, a software application such as an analysis software application or a tabulation display software application. In this case, all the first communication module 15 has to do is to enable the management computer 25 to receive the first machine information outputted from each machine 11 or 12. On the other hand, all the second communication module 16 has to do is to enable the management computer 25 to output the second machine information to the operation software application 14.

The first machine information and the second command information transmitted and received between the management computer 25 and each machine 11 or 12 are information in a data format specific to each machine 11 or 12. On the other hand, the second machine information and the first command information inputted and outputted between the base software application 13 and the operation software application 14 in the management computer 25 are information in a data format specific to the operation software application 14.

Therefore, the base software application 13 according to this embodiment further includes a program portion (hereinafter referred to as a machine information conversion unit) to enable the management computer 25 to convert the first machine information into the second machine information, and a program portion (hereinafter referred to as a command information conversion unit) to enable the management computer 25 to convert the first command information into the second command information.

Figure 3:
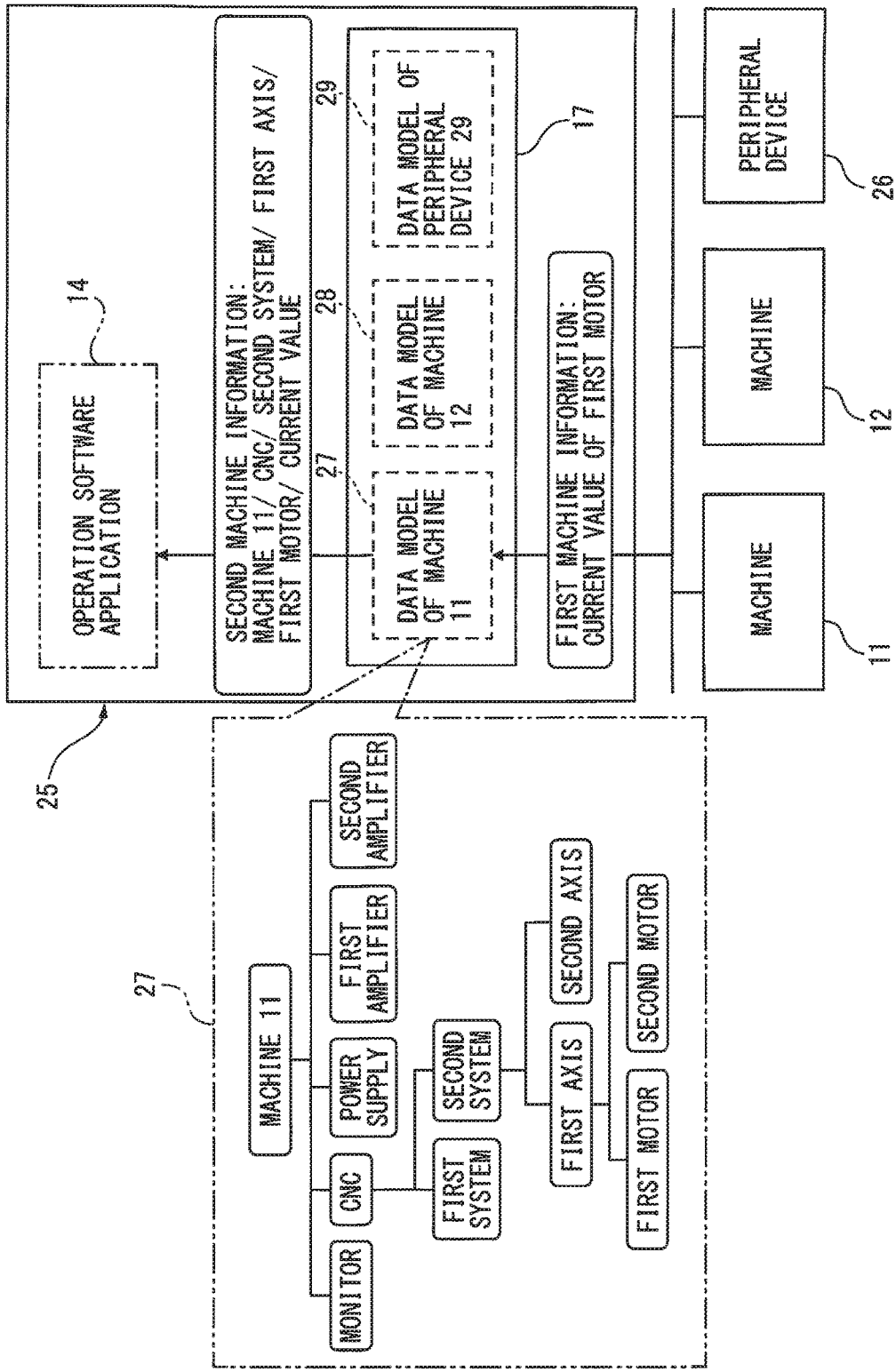
FIG. 3 is a drawing schematically showing an example of data models used when converting first machine information into second machine information.
Figure 4:
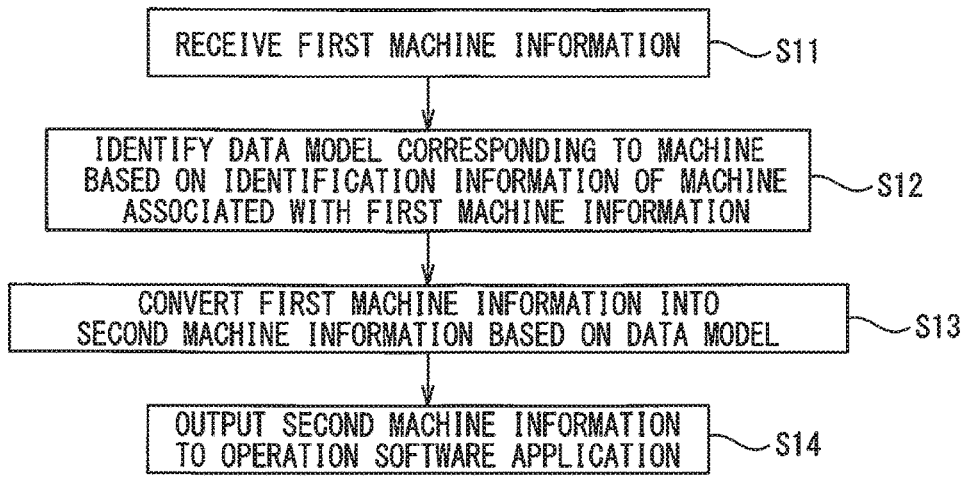
FIG. 4 is a flowchart of an operation in which the first machine information from the machine is converted into the second machine information and the second machine information is outputted to an operation software application.

An example of an aspect in which the management computer 25 converts first machine information in a machine-specific data format into second machine information in an operation software application-specific data format by the base software application 13, and outputs the second machine information to the operation software application 14 will be described. FIG. 3 is a drawing schematically showing this aspect, and FIG. 4 is a flowchart of the operation of the management computer 25 including a machine information conversion step shown in FIG. 3.

As shown in FIG. 3, the machines 11 and 12 such as machine tools or industrial robots, a peripheral device 26, etc., are communicably connected to the management computer 25. First information is outputted from each of the machines 11 and 12 and the peripheral device 26 to the management computer 25. The management computer 25 can recognize which machine the first machine information belongs to from machine-specific identification information associated with the first machine information. However, the first machine information transmitted from one machine 11 to the management computer 25 is not limited to just one kind of information. For example, when the machine 11 is a multipath controllable multiaxial NC machine tool and a CNC (computerized numerical controller) of the machine 11 controls a first axis of the machine 11 using a first motor and a second motor according to a second system program, the current values of the first motor and the second motor are each transmitted to the management computer 25 as the first machine information. Furthermore, if the CNC executes a first system program simultaneously with the second system program, the current values of motors for each axis controlled by the first system are also transmitted to the management computer 25 as the first machine information. Since the first machine information just indicates which motors the current values correspond to, it is not easy to know that the current values of the motors correspond to which axes controlled by which system programs executed by the CNC of the machine 11. The first machine information is in a machine-specific data format, not structured data (so-called definite format data). Thus, the first machine information is difficult to deal with in data analysis, when the operation software application 14 is, for example, a machine information analysis software application, a tabulation display software application, or the like. In order to allow the operation software application to deal with machine-specific information in real time, the first machine information in the machine-specific data format is required to be converted into the second machine information in an operation software application-specific data format.

For this reason, the memory unit 17 of the management computer 25 preferably stores information (hereinafter referred to as a data model) 27, 28, and 29 that represent the subordination of a plurality of devices used in each of the machine 11, the machine 12, and the peripheral device 26, etc., in advance.

For example, when the machine 11 is the multiaxial NC machine tool, as described above, the data model 27 may be a tree-type or network-type data structure that represents the subordination of devices such as a monitor, a CNC, a power supply, a servo amplifier, a feed shaft, a motor, etc., constituting the NC machine tool. In this case, the data model 27 preferably contains specification information of each device.

The CPU of the management computer 25 can convert first machine information i.e. "current value" outputted from the first motor of the machine 11 into second machine information i.e. "machine 11/CNC/second system/first axis/first motor/current value", with reference to the data model 27 as described above. This conversion process facilitates identifying the current value outputted from the machine 11 as a current value of the first motor of the first axis controlled by the second system program executed by the CNC of the machine 11. That is, in order to allow the operation software application 14 to deal with first machine information in an indefinite format from the machines 11 and 12, the first machine information can be converted into definite format information (so-called structured data) containing the first machine information and information about all devices derived from the first machine information.

The current value of the motor is described above as a part of the first machine information and the second machine information, but the present invention is not limited thereto. A part of the first machine information and the second machine information include information about at least one of an operating time of the machine 11 or 12, the current value, vibration value, generated temperature, and sound volume of a motor, and position information of each machine 11 or 12.

As described above, when the first machine information is converted into the second machine information according to the machine information conversion unit of the base software application 13, the management computer 25 performs the conversion based on the data models 27 to 29 stored in the memory unit 17. More specifically, as shown in FIG. 4, when the management computer 25 receives first machine information (step S11), the management computer 25 identifies a data model corresponding to a machine from the memory unit 17 based on identification information of the machine associated with the received first machine information (step S12). The management computer 25 converts the first machine information into second machine information based on the identified data model (step S13), and outputs the second machine information to the operation software application 14 (step S14). In step S14, the second machine information is preferably outputted to the operation software application 14 in association with the identification information of the identified machine. The above operation is realized by enabling the management computer 25 to execute the machine information conversion unit of the base software application 13.

Figure 5:
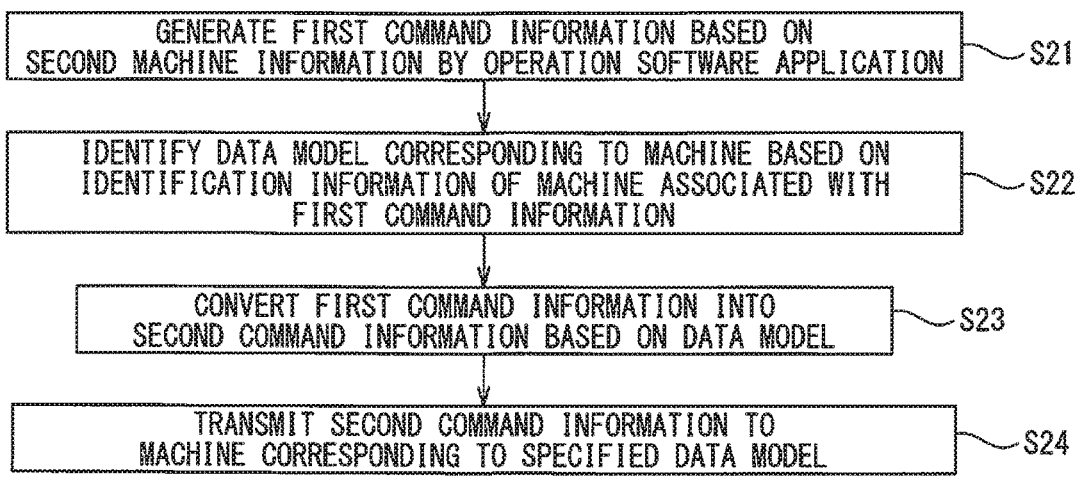
FIG. 5 is a flowchart of an operation in which first command information from the operation software application is converted into second command information and the second information is transmitted to the machine.

Although the conversion of the machine information is described above, the conversion of the command information can be performed in the same manner. When first command information is converted into second command information according to the command information conversion unit of the base software application 13, the management computer 25 performs the conversion based on the data models 27 to 29 stored in the memory unit 17. More specifically, as shown in FIG. 5, the management computer 25 converts first command information based on second machine information by the operation software application 14 (step S21). At this time, the machine-specific identification information is preferably associated with the generated first command information. The management computer 25 identifies a data model corresponding to a machine from the memory unit 17 based on the identification information of the machine associated with the generated first command information (step S22). The management computer 25 converts the first command information into second command information based on the identified data model (step S23), and transmits the second command information to the machine corresponding to the identified data model (step S24). The above operation is realized by enabling the management computer 25 to execute the command information conversion unit of the base software application 13.

In the above example of the multiaxial NC machine tool, the first command information that represents what operation is commanded to which device included in which machine e.g. "machine 11/CNC/second system/first axis/first motor/current command value" can be converted into the second command information e.g. "current command value" based on the data model 27, and the current command value can be outputted to the first motor for driving the first axis of the second system of the CNC in the machine 11.

In the machine system 10 according to this embodiment, the machines 11 and 12 are installed in, for example, a plant for manufacturing products. On the other hand, the base software application 13 is installed in the management computer 25 disposed in, for example, another building in the site of the plant having the machines 11 and 12. In this case, the management computer 25 is preferably connected to each machine 11 or 12 so as to establish intercommunication therewith over an intranet e.g. a fieldbus network. The management computer 25 is a computer for machine control. Furthermore, the management computer 25 is preferably connected to a host computer 24 (refer to FIG. 2) disposed in e.g. an office in a remote location so as to establish intercommunication therewith over the Internet. The host computer 24 is, for example, a manufacturing execution system (MES) that makes a production plan for the machines 11 and 12 and manages a production state in the office.

The base software application 13 and the operation software application 14 are preferably installed in the management computer 25 from computer-readable portable recording mediums using well-known setup programs or the like. The portable recording medium is, for example, a CD-ROM (compact disk read only memory unit), a DVD-ROM (digital versatile disk read only memory unit), or the like. When the base software application 13 and the operation software application 14 are each recorded in the recording mediums, the management computer 25 preferably includes drives for the recording mediums. The base software application 13 and the operation software application 14 may be downloaded from other computers connected to the management computer 25 through the Internet, Ethernet (trademark), or the like.

The base software application 13 according to this embodiment can be a base i.e. a software platform for running not only a single operation software application 14 but a plurality of operation software applications 14 for performing different types of processing. In this case, each operation software application 14 preferably includes in advance identification information assigned to a machine to which information processing is to be performed, and each operation software application 14 is preferably programmed so as to obtain second machine information based on the identification information of the machine. Thus, even when the plurality of operation software applications 14 are installed in the management computer 25, the management computer 25 can recognize that the second machine information belongs to which machine processed by which operation software application 14, from the identification information of the machine associated with the second machine information.

The base software application 13 does not include only the first communication module 15, the second communication module 16, the machine information conversion unit, and the command information conversion unit as described above. The base software application 13 preferably includes various types of other program portions such as a determination unit, a third communication module 20, a fourth communication module 22, a billing processing unit, and a version management unit to be executed by the CPU of the management computer 25.

To be more specific, in the machine system 10 according to this embodiment, the base software application 13 preferably further includes a determination unit (not shown) that is a program portion to enable the management computer 25 to determine whether the operation software application 14 is appropriate or inappropriate. When the determination unit determines the operation software application 14 to be inappropriate, the CPU of the management computer 25 is preferably disabled from executing the second communication module 16. In this case, the operation software application 14 preferably includes certification record information 18, which is based on information about a maker of the operation software application 14 and an examination result of the operation software application 14. For example, the maker of the operation software application 14 actually installs a generated operation software application 14 in a computer system identical to the management computer 25, and approves the operation software application 14 as a safe product, when an examination result is favorable. The maker records information about the approval on the operation software application 14 together with the maker information. The information recorded at this time may be the certification record information 18 described above. Note that, a maker of the base software application 13 or the like may give the approval based on an examination result of the operation software application 14 by the maker of the operation software application 14.

In this configuration, a part of the first command information to be inputted from the operation software application 14 to the base software application 13 is the certification record information 18. When the determination unit determines that the certification record information 18 is inappropriate, for example, when the maker is unidentified or there is no information about approval, the base software application 13 preferably disables the CPU of the management computer 25 from executing the second communication module 16. Thus, when the operation software application 14 is inappropriate, a communication control unit (not shown), which is a hardware interface of the management computer 25, can be disabled from functioning. In other words, when the operation software application 14 is unapproved, the base software application 13 does not transmit and receive the machine information and the command information between the operation software application 14 and the base software application 13.

Also, at least one of the base software application 13 and the operation software application 14 preferably further includes a billing processing unit that is a program portion to enable the CPU of the management computer 25 to execute billing processing based on usage of at least one of the base software application 13 and the operation software application 14 to charge a user for a usage fee. The billing processing unit preferably enables the CPU of the management computer 25 to determine whether or not the usage fee for at least one of the base software application 13 and the operation software application 14 has been paid.

The billing processing unit is preferably a program portion to enable the CPU of the management computer 25 to monitor the duration of use of at least one of the base software application 13 and the operation software application 14 from a starting point, and generate fee payment information and output the fee payment information to the first communication module 15 at established intervals. The fee payment information is information required by the CPU of the management computer 25 to determine whether or not a usage fee for at least one of the base software application 13 and the operation software application 14 has been paid. The fee payment information is information to let a user input a payment certification code that is obtained in exchange for payment of the usage fee to a maker of the management computer 25, a collecting agent commissioned by the maker, a collecting machine of the collecting agent, or the like, a credit card number of a credit card company designated by the maker, or the like.

According to this configuration, for example, the first communication module 15 can enable the management computer 25 to control the transmission and reception of information to and from each machine 11 or 12 based on the fee payment information on the base software application 13 or the operation software application 14. For example, when the payment certification code, which can determine the presence or absence of payment, or the like is not inputted to the management computer 25, the management computer 25 stops or decelerates communication with each machine 11 or 12.

Furthermore, as shown in FIG. 1, the base software application 13 preferably further includes a third communication module 20 that is a program portion to enable the management computer 25 to communicate with an external device such as a monitor 19. In this configuration, the above billing processing unit is preferably a program portion that enables the CPU of the management computer 25 to monitor the duration of use of at least one of the base software application 13 and the operation software application 14 from a starting point, and generate fee payment information and output the fee payment information to the first communication module 15 at established intervals.

According to this configuration, for example, the third communication module 20 can enable the management computer 25 to display a warning message about the absence of payment on the monitor 19, based on the fee payment information on the base software application 13 or the operation software application 14. For example, when a payment certification code, which determines the presence or absence of payment, or the like is not inputted to the management computer 25, the management computer 25 displays a message indicating that payment cannot be ascertained, on the monitor 19.

The starting point of the monitoring is, for example, the timing of installing at least one of the base software application 13 and the operation software application 14. The starting point may be the date of purchase of at least one of the base software application 13 and the operation software application 14.

The above billing processing unit enables the management computer 25 to charge a usage fee in accordance with the duration of use of at least one of the base software application 13 and the operation software application 14 from a starting point, but the present invention is not limited thereto.

For example, the billing processing unit may enable the management computer 25 not to charge a usage fee, when the duration of use of at least one of the base software application 13 and the operation software application 14 from a starting point is within a certain time period.

The billing processing unit may enable the management computer 25 to determine the duration of use of at least one of the base software application 13 and the operation software application 14 in accordance with a fixed fee payment status of at least one of the base software application 13 and the operation software application 14. For example, a fixed usage fee, e.g. a monthly fee or an annual fee for the base software application 13 is set. When starting executing the base software application 13 or the operation software application 14, if information to determine the presence or absence of payment of the fixed usage fee for the base software application 13 e.g. a payment certification code has already been inputted to the management computer 25, the management computer 25 permits communication with the machines 11 and 12 etc., for an indefinite or definite duration.

The billing processing unit may monitor a communication traffic volume on at least one of the base software application 13 and the operation software application 14, and enable the management computer 25 to execute the billing processing in accordance with the communication traffic volume. In this case, the management computer 25 obtains a communication traffic volume of at least one of the first machine information and the second command information communicated with the machines 11 and 12, calculates a fee based on the communication traffic volume, and controls communication with the machines 11 and 12 in accordance with the payment status of the fee.

The billing processing unit may monitor an information throughput when processing first machine information outputted from each machine 11 or 12 by the base software application 13 and an information throughput when processing second machine information outputted from the base software application 13 by the operation software application 14, and enable the management computer 25 to execute the billing processing according to the information throughput.

The billing processing unit may count the number of executions of at least one of the base software application 13 and the operation software application 14, and enable the management computer 25 to execute the billing processing in accordance with the number of executions.

The billing processing unit may recognize the number of machines connected to the management computer 25, and enable the management computer 25 to execute the billing processing in accordance with the recognized number of machines. In this case, the number of connected machines may be recognized by energization states of connection terminals of the management computer 25 provided for connection with the machines 11 and 12, etc.

The billing processing unit may recognize the number of people registered as users with the management computer 25, and enable the management computer 25 to execute the billing processing in accordance with the recognized number of users. In this case, the billing processing unit may recognize the number of users of the management computer 25 based on user names and passwords inputted to a login screen.

In the above machine system 10, the base software application 13 preferably further includes a version management unit that is a program portion to enable the management computer 25 to manage the version (version number) of at least one of the base software application 13 and the operation software application 14. In this case, as shown in FIG. 1, the machine system 10 preferably further includes a second memory unit 21 that stores the latest version number of at least one of the base software application 13 and the operation software application 14. In this configuration, the base software application 13 preferably further includes a fourth communication module 22 that is a program portion to enable the management computer 25 to check the contents of the second memory unit 21 by mutual communication with the second memory unit 21. When the latest version number of at least one of the base software application 13 and the operation software application 14 stored in the second memory unit 21 is later than the current version number of the software (13 or 14), the version management unit preferably enables the management computer 25 to output the latest version number to the first communication module 15 or the third communication module 20.

Furthermore, at least one of the base software application 13 and the operation software application 14 preferably further includes a program portion that enables the management computer 25 to execute license authentication of at least one of the base software application 13 and the operation software application 14. For example, after the base software application 13 or the operation software application 14 is installed in the management computer 25, the management computer 25 displays information that requires a user to input a software-specific ID e.g. a product key or a digital certificate to the management computer 25 on the monitor 19, before reaching a certain period of time or a certain running number predetermined for each application. The product key or the digital certificate is preferably issued in exchange for fee payment for the base software application 13 or the operation software application 14. The management computer 25 checks the software-specific ID inputted by the user in accordance with the displayed information, and only when an agreement on license provisions is verified, the management computer 25 determines that license authentication is completed. The functions of the base software application 13 or the operation software application 14 are stopped or limited, while the license authentication is not completed. When a plurality of licenses are provided for each of the base software application 13 and the operation software application 14, the number of installations or executions of each software application is counted. When the number exceeds a given license number, the functions of the operation software application 13 or the operation software application 14 are preferably stopped or limited.

At least one of the base software application 13 and the operation software application 14 preferably further includes a copy protection function. For example, when the base software application 13 or the operation software application 14 is copied to a computer other than the management computer 25, the copied base software application 13 or operation software application 14 is preferably encoded so that the computer cannot execute the copied base software application 13 or operation software application 14 without a decode key. The base software application 13 or the operation software application 14 may have the function of limiting the number of copies. Otherwise, the base software application 13 or the operation software application 14 itself may determine whether or not the base software application 13 or the operation software application 14 is stored in the management computer 25, and when none of the software applications is stored in the management computer 25, the base software application 13 or the operation software application 14 disables execution.

At least one of the base software application 13 and the operation software application 14 preferably includes a program portion that enables the management computer 25 to add advertisement information to information outputted to the external device 19 through the third communication module 20. This allows the maker of the management computer 25 to advertise the maker's products to a user of the management computer 25.

At least one of the base software application 13 and the operation software application 14 preferably includes a program portion that enables the management computer 25 to provide personal assistance. As an example of the personal assistance, when a user desires to collect required machine information from the machine 11 to the management computer 25, only the required information is preferably collected and outputted from the management computer 25, upon the user's request to the management computer 25 for the required information from the machines 11 and 12, etc. As the function of the personal assistance, when a person speaks to a microphone connected to the management computer 25, the management computer 25 may understand spoken words and answer the words by sound, text, or the like.

The base software application 13 preferably includes a program portion that enables the management computer 25 to authenticate devices connected to the management computer 25, e.g. the machine 11, the machine 12, the peripheral device 26, etc. For example, the management computer 25 can detect the connection of the devices by energization states of connection terminals connected to the devices. In response to the detection of the connection, the management computer 25 receives specific identification information e.g. MAC addresses (media access control addresses) from the devices, and determines whether or not the received MAC addresses have already been registered with the management computer 25. When the received MAC addresses have been registered with the management computer 25, the management computer 25 allows communication with the connected devices e.g. the machines 11 and 12.

The machine system 10 preferably includes the host computer 24 connected to the management computer 25 through the Internet (see FIG. 2). In this case, the second communication module 16 of the base software application 13 preferably enables the management computer 25 to upload the first machine information, the second machine information, or information related to the first machine information or the second machine information to the host computer 24 in response to a command from the host computer 24. In addition, the second communication module 16 preferably enables the management computer 25 to download data or a program from the host computer 24 to the management computer 25 in response to a command from the host computer 24.

A machine learning software application is preferably installed in the management computer 25 in order to enable the management computer 25 to execute machine learning based on the second machine information. The machine learning includes deep learning, reinforcement learning, etc. The second machine information is definite format information (structured data) as described above, and hence is easy to handle in the machine learning.

In this case, the second communication module 16 of the base software application 13 preferably enables the management computer 25 to upload data after the execution of the machine learning, e.g. a learned model to the host computer 24 in response to a command from the host computer 24. In addition, the second communication module 16 preferably enables the management computer 25 to download data or a program for the machine learning corrected or generated by the host computer 24 to the management computer 25 in response to a command from the host computer 24.

Concrete examples of the first machine information and the second command information transmitted and received between the management computer 25 and each machine 11 or 12 and the second machine information and the first command information transmitted and received between the base software application 13 and the operation software application 14 will be described below.

A part of the first machine information and the second machine information are, for example, information about at least one of an operating time of the machine 11 or 12 and the current value, vibration value, generated temperature, and sound volume of a motor. A part of the first command information and the second command information are information about at least one of a stop or deceleration command for the machine 11 or 12 and a warning display. By transmitting and receiving the information to and from the base software application 13, the base software application 13 can detect a malfunction of each machine 11 or 12.

The first machine information may include position information on the machine 11 or 12. In this case, a part of the second command information is preferably operation command information for the machine 11 or 12 in order to prevent interference between the machines by issuing a stop command to the machine having a lower priority, when the relative position between the machines 11 and 12 is within a certain distance. By transmitting and receiving the information to and from the base software application 13, the base software application 13 can prevent the interference between the machines 11 and 12.

The first machine information may include operation reception information and operation completion information on the machine 11 or 12. In this case, a part of the second command information is preferably operation command information including at least one of a choice of contents, an operation sequence, an actuation of the machine 11 or 12, and a stop of the machine 11 or 12 as to operations stored in advance in the machine 11 or 12. By transmitting and receiving the information to and from the base software application 13, the base software application 13 can manage the operation state of each machine 11 or 12.

The first machine information may include information about the state of an object to be operated of the machine 11 or 12. In this case, a part of the second command information is preferably operation change command information to change the operation of the machine 11 or 12 in accordance with the state of the object to be operated. By transmitting and receiving the information to and from the base software application 13, the base software application 13 can correct, complement, or examine the operation of each machine 11 or 12 in accordance with the state of the object to be operated of each machine 11 or 12.

The first machine information may include scheduled operation information on the machine 11 or 12. In this case, a part of the second command information is preferably a determination result of whether the scheduled operation of the machine 11 or 12 is appropriate or inappropriate. By transmitting and receiving the information to and from the base software application 13, the base software application 13 can check a simulation result of the operation of the machine 11 or 12.

Note that, each machine 11 or 12 is not limited to the machine tool or the industrial robot, but may be a PLC (programmable logic controller), a carrier, a measuring instrument, a tester, a pressing machine, a press fitting machine, a printer, a die cast machine, an injection molding machine, a food machine, a packaging machine, a welder, a washer, a coating machine, an assembling machine, a mounting machine, a wood working machine, a sealing machine, a cutter, or the like.

Each memory unit 17 or 21 is, for example, a memory device such as a RAM (random access memory unit), a fixed disk drive such as a hard disk, a magnetic tape drive, a magnetic disk drive, an optical disk drive, or the like.

As described above, according to the machine system 10 of this embodiment, the transmission and reception of information among the base software application 13, the operation software application 14, and each machine 11 or 12 allows storing and managing the information at the time of the transmission and reception, while performing the operation of each machine. For example, the transmission and reception of the information may be limited based on the certification record information included in the operation software application 14. The fee payment information on the operation software application 14 or the base software application 13 may be outputted to the first communication module 15 or the third communication module 20.

The present invention is described above using the typical embodiment, but those skilled in the art can recognize that the above embodiment can be variously modified, omitted, or added without departing from the scope of the present invention.

The invention claimed is:

1. A machine system, comprising:
a machine; and
a machine control computer communicatably connected to the machine and comprising one or more control processing units and one or more memory units, a base software application and an operation software application being installed in the machine control computer,
wherein the base software application includes:
a first communication module being a program portion to enable the machine control computer to receive first machine information in a data format specific to the machine outputted from the machine to the machine control computer;
a second communication module being a program portion to enable the machine control computer to output second machine information in a data format specific to the operation software application to the operation software application;
a program portion to store the first machine information and the second machine information in a first memory unit included in the one or more memory units of the machine control computer;
a program portion to identify a data model corresponding to the machine from the first memory unit based on identification information of the machine associated with the first machine information; and
a program portion to enable the machine control computer to convert the first machine information into the second machine information based on the identified data model,
wherein the machine has a function of outputting a state of the machine to the machine control computer as the first machine information, and
wherein the operation software application is a program using the second machine information outputted from the second communication module as input information.

2. The machine system according to claim 1, wherein
the first memory unit stores in advance data models representing a subordination of a plurality of devices constituting the machine, and
when converting the first machine information into the second machine information by the base software application, the machine control computer performs a conversion based on the data models stored in advance in the first memory unit.

3. The machine system according to claim 1, wherein
the base software application further includes a determination unit being a program portion to enable the machine control computer to determine whether the operation software application is appropriate or inappropriate, and
when the determination unit determines that the operation software application is inappropriate, the base software application disables the machine control computer from executing the second communication module.

4. The machine system according to claim 1, wherein at least one of the base software application and the operation software application further includes a billing processing unit being a program portion to enable the machine control computer to charge a fee based on usage of at least one of the base software application and the operation software application.

5. The machine system according to claim 4, wherein the billing processing unit is a program portion to enable the machine control computer to monitor a duration of use of at least one of the base software application and the operation software application from a starting point, and, at established intervals, generate information about payment of the fee and output the information about payment of the fee to the first communication module.

6. The machine system according to claim 5, wherein the starting point is a timing of installing at least one of the base software application and the operation software application.

7. The machine system according to claim 5, wherein the starting point is a date of purchase of at least one of the base software application and the operation software application.

8. The machine system according to claim 4, wherein
the operation software application further includes a third communication module being a program portion to enable the machine control computer to communicate with an external device, and
the billing processing unit is a program portion to enable the machine control computer to monitor a duration of use of at least one of the base software application and the operation software application from a starting point, and, at established intervals, generate information about payment of the fee and output the information about payment of the fee to the third communication module.

9. The machine system according to claim 4, wherein the billing processing unit enables the machine control computer to charge the fee in accordance with a communication traffic volume on at least one of the base software application and the operation software application.

10. The machine system according to claim 4, wherein the billing processing unit enables the machine control computer to charge the fee in accordance with a number of executions of at least one of the base software application and the operation software application.

11. The machine system according to claim 4, wherein the billing processing unit enables the machine control computer to charge the fee in accordance with a number of machines connected to the machine control computer.

12. The machine system according to claim 4, wherein the billing processing unit enables the machine control computer to charge the fee in accordance with at least one of an information throughput when processing the first machine information by the base software application and an information throughput when processing the second machine information by the operation software application.

13. The machine system according to claim 4, wherein the billing processing unit enables the machine control computer to charge the fee in accordance with a number of people who have used the machine control computer.

14. The machine system according to claim 4, wherein the billing processing unit enables the machine control computer to determine a duration of use of at least one of the base software application and the operation software application in accordance with a payment status of a usage fee predetermined for at least one of the base software application and the operation software application.

15. The machine system according to claim 4, wherein the billing processing unit disables the machine control computer from charging the fee, when a duration of use of at least one of the base software application and the operation software application from a starting point is within a certain time period.

16. The machine system according to claim 4, wherein the billing processing unit enables the machine control computer to determine whether or not payment of the fee is completed.

17. The machine system according to claim 1, wherein the base software application further includes a version management unit being a program portion to enable the machine control computer to manage a version number of at least one of the base software application and the operation software application.

18. The machine system according to claim 14, wherein:
a second memory unit included in the one or more memory units of the machine control computer stores a latest version number of at least one of the base software application and the operation software application,
the base software application further includes a third communication module being a program portion to enable the machine control computer to check contents of the second memory unit, and
the version management unit is a program portion to enable the machine control computer to output the latest version number of at least one of the base software application and the operation software application to the third communication module, when the latest version number of at least one of the base software application and the operation software application stored in the second memory unit is later than a current version number of at least one of the base software application and the operation software application.

19. The machine system according to claim 14, wherein:
a second memory unit included in the one or more memory units of the machine control computer stores a latest version number of at least one of the base software application and the operation software application,
the base software application further includes a third communication module being a program portion to enable the machine control computer to communicate with an external device, and a fourth communication module being a program portion to enable the machine control computer to check contents of the second memory unit, and the version management unit is a program portion to enable the machine control computer to output the latest version number of at least one of the base software application and the operation software application to the third communication module, when the latest version number of at least one of the base software application and the operation software application stored in the second memory unit is later than a current version number of at least one of the base software application and the operation software application.

20. The machine system according to claim 1, wherein at least one of the base software application and the operation software application includes a program portion to enable the machine control computer to execute license authentication of at least one of the base software application and the operation software application.

21. The machine system according to claim 1, wherein at least one of the base software application and the operation software application has a copy protection function.

22. The machine system according to claim 1, wherein at least one of the base software application and the operation software application includes a program portion to enable the machine control computer to add advertisement information to information to be outputted outside the machine control computer.

23. The machine system according to claim 1, wherein at least one of the base software application and the operation software application includes a program portion to enable the machine control computer to execute personal assistance.

24. The machine system according to claim 1, wherein the base software application includes a program portion to enable the machine control computer to authenticate the machine connected to the machine control computer.

25. The machine system according to claim 1, wherein a machine learning software application is installed in the machine control computer to enable the machine control computer to perform machine learning based on the second machine information.

26. The machine system according to claim 1, further comprising:
a host computer connected to the machine control computer through the Internet, wherein the second communication module enables the machine control computer to upload the first machine information or the second machine information to the host computer in response to a command from the host computer.

27. The machine system according to claim 1, further comprising:
a host computer connected to the machine control computer through the Internet, wherein the second communication module enables the machine control computer to download data or a program from the host computer to the machine control computer in response to a command from the host computer.

28. The machine system according to claim 1, wherein a part of the first machine information and the second machine information are information about at least one of an operating time of the machine, a current value, a vibration value, a generated temperature, a sound volume of a motor, and position information of the machine.

29. The machine system according to claim 1, wherein the machine is a production machine or an industrial robot.

30. A machine system, comprising:
at least two machines; and
a machine control computer communicatably connected to the at least two machines and comprising one or more control processing units and one or more memory units, a base software application and an operation software application being installed in the machine control computer,
wherein the base software application includes:
a first communication module being a program portion to enable the machine control computer to receive first machine information in a data format specific to each machine of the at least two machines outputted from each machine of the at least two machines in association with identification information of each machine of the at least two machines to the machine control computer;
a second communication module being a program portion to enable the machine control computer to output second machine information in a data format specific to the operation software application to the operation software application in association with the identification information of each machine of the at least two machines;
a program portion to store the first machine information and the second machine information in a memory unit included in the one or more memory units of the machine control computer in association with the identification information of each machine of the at least two machines;
a program portion to identify a data model corresponding to each machine of the at least two machines from the memory unit based on the identification information of each machine of the at least two machines associated with the first machine information; and
a program portion to enable the machine control computer to convert the first machine information into the second machine information based on the identified data model,
wherein each machine of the at least two machines has a function of outputting a state of each machine of the at least two machines to the machine control computer as the first machine information in association with the identification information of each machine of the at least two machines, and
wherein the operation software application is a program using the second machine information outputted from the second communication module as input information.

31. A machine system, comprising:
a machine; and
a machine control computer communicatably connected to the machine and comprising one or more control processing units and one or more memory units, a base software application and an operation software application being installed in the machine control computer,
wherein the base software application includes:
a first communication module being a program portion to enable the machine control computer to receive first machine information in a data format specific to the machine outputted from the machine to the machine control computer, and transmit second command information in the data format specific to the machine to the machine;
a second communication module being a program portion to enable the machine control computer to input first command information in a data format specific to the operation software application from the operation software application, and output second machine information in the data format specific to the operation software application to the operation software application;

a program portion to store the first machine information, the second machine information, the first command information, and the second command information in a memory unit included in the one or more memory units of the machine control computer;

a program portion to identify a data model corresponding to the machine from the memory unit based on identification information of the machine associated with the first command information;

a program portion to enable the machine control computer to convert the first machine information into the second machine information based on the identified data model; and a program portion to enable the machine control computer to convert the first command information into the second command information based on the identified data model, wherein the machine has functions of outputting a state of the machine to the machine control computer as the first machine information, and determining an operation to be performed by the machine based on the second command information, and wherein the operation software application is a program to enable the machine control computer to generate the first command information for the machine based on the second machine information inputted from the second communication module, and output the first command information to the second communication module.

32. The machine system according to claim 31, wherein the base software application further includes a determination unit being a program portion to enable the machine control computer to determine whether the operation software application is appropriate or inappropriate, the operation software application includes certification record information based on maker information of the operation software application and an examination result of the operation software application, a part of the first command information is the certification record information, and when the determination unit determines that the certification record information is inappropriate, the base software application disables the machine control computer from executing the second communication module.

33. The machine system according to claim 31, wherein
a part of the first machine information and the second machine information are information about at least one of an operating time of the machine, a current value, a vibration value, a generated temperature, and a sound volume of a motor, and a part of the first command information and the second command information are information about at least one of a stop or deceleration command for the machine and a warning display.

34. The machine system according to claim 31, wherein
a part of the first machine information is position information of the machine, and when a relative position between a plurality of machines is within a certain distance, a part of the second command information is operation command information for the plurality of machines in order to prevent interference between the plurality of machines by issuing a stop command to a machine having a lower priority.

35. The machine system according to claim 31, wherein
a part of the first machine information is operation reception information and operation completion information on the machine, and a part of the second command information is operation command information including at least one of a choice of contents, an operation sequence, an actuation of the machine, and a stop of the machine as to an operation stored in advance in the machine.

36. The machine system according to claim 31, wherein
a part of the first machine information is information about a state of an object to be operated at the machine, and a part of the second command information is operation change command information to change the operation on the machine in accordance with the state of the object to be operated at the machine.

37. The machine system according to claim 31, wherein
a part of the first machine information is scheduled operation information on the machine, and a part of the second command information is a determination result of whether a scheduled operation of the machine is appropriate or inappropriate.

38. A machine control computer communicatably connected to a machine, the machine control computer comprising:

one or more control processing units;

one or more memory units;

a base software application installed in the machine control computer; and an operation software application installed in the machine control computer, wherein the base software application includes:

a first communication module being a program portion to enable the machine control computer to receive first machine information in a data format specific to the machine outputted from the machine to the machine control computer;

a second communication module being a program portion to enable the machine control computer to output second machine information in a data format specific to the operation software application to the operation software application;

a program portion to store the first machine information and the second machine information in a memory unit included in the one or more memory units of the machine control computer;

a program portion to identify a data model corresponding to the machine from the memory unit based on identification information of the machine associated with the first machine information; and a program portion to enable the machine control computer to convert the first machine information into the second machine information based on the identified data model, wherein the machine has a function of outputting a state of the machine to the machine control computer as the first machine information, and wherein the operation software application is a program using the second machine information outputted from the second communication module as input information.

39. A machine control computer communicatably connected to at least two machines, comprising:
one or more control processing units;
one or more memory units;
a base software application installed in the machine control computer; and
an operation software application installed in the machine control computer,
wherein the base software application includes:
a first communication module being a program portion to enable the machine control computer to receive first machine information in a data format specific to each machine of the at least two machines outputted from each machine of the at least two machines in association with identification information of each machine of the at least two machines to the machine control computer;
a second communication module being a program portion to enable the machine control computer to output second machine information in a data format specific to the operation software application to the operation software application in association with the identification information of each machine of the at least two machines;
a program portion to store the first machine information and the second machine information in a memory unit included in the one or more memory units of the machine control computer in association with the identification information of each machine of the at least two machines;
a program portion to identify a data model corresponding to each machine of the at least two machines from the memory unit based on the identification information of each machine of the at least two machines associated with the first machine information; and
a program portion to enable the machine control computer to convert the first machine information into the second machine information based on the identified data model,
wherein each machine of the at least two machines has a function of outputting a state of each machine of the at least two machines to the machine control computer as the first machine information in association with the identification information of each machine of the at least two machines, and
wherein the operation software application is a program using the second machine information outputted from the second communication module as input information.

40. A machine control computer communicatably connected to a machine, comprising:
one or more control processing units;
one or more memory units;
a base software application installed in the machine control computer; and
an operation software application installed in the machine control computer,
wherein the base software application includes:
a first communication module being a program portion to enable the machine control computer to receive first machine information in a data format specific to the machine outputted from the machine to the machine control computer, and transmit second command information in the data format specific to the machine to the machine;
a second communication module being a program portion to enable the machine control computer to input first command information in a data format specific to the operation software application from the operation software application, and output second machine information in the data format specific to the operation software application to the operation software application;
a program portion to store the first machine information, the second machine information, the first command information, and the second command information in a memory unit included in the one or more memory units of the machine control computer;
a program portion to identify a data model corresponding to the machine from the memory unit based on identification information of the machine associated with the first command information;
a program portion to enable the machine control computer to convert the first machine information into the second machine information based on the identified data model; and
a program portion to enable the machine control computer to convert the first command information into the second command information based on the identified data model,
wherein the machine has functions of outputting a state of the machine to the machine control computer as the first machine information, and determining an operation to be performed by the machine based on the second command information, and
wherein the operation software application is a program to enable the machine control computer to generate the first command information for the machine based on the second machine information inputted from the second communication module, and output the first command information to the second communication module.

41. A non-transitory computer-readable recording medium for storing a base software application to be installed in a machine control computer communicatably connected to a machine, together with an operation software application, the base software application enabling the machine control computer to execute the steps of:
receiving first machine information in a data format specific to the machine outputted from the machine to the machine control computer;
outputting second machine information in a data format specific to the operation software application to the operation software application;
storing the first machine information and the second machine information in a memory unit included in the machine control computer;
identifying a data model corresponding to the machine from the memory unit based on identification information of the machine associated with the first machine information;
converting the first machine information into the second machine information based on the identified data model; and
outputting the second machine information to the operation software application as input information,
wherein the machine has a function of outputting a state of the machine to the machine control computer as the first machine information.

42. A non-transitory computer-readable recording medium for storing a base software application to be installed in a machine control computer communicatably connected to at least two machines, together with an operation software application, the base software application enabling the machine control computer to execute the steps of:

receiving first machine information in a data format specific to each machine of the at least two machines outputted from each machine of the at least two machines in association with identification information of each machine of the at least two machines to the machine control computer;

outputting second machine information in a data format specific to the operation software application to the operation software application in association with the identification information of each machine of the at least two machines;

storing the first machine information and the second machine information in a memory unit included in the machine control computer in association with the identification information of each machine of the at least two machines;

identifying a data model corresponding to each machine of the at least two machines from the memory unit based on the identification information of each machine of the at least two machines associated with the first machine information;

converting the first machine information into the second machine information based on the identified data model; and outputting the second machine information to the operation software application in association with the identification information of each machine of the at least two machines as input information, wherein each machine of the at least two machines has a function of outputting a state of each machine of the at least two machines to the machine control computer as the first machine information in association with the identification information of each machine of the at least two machines.

43. A non-transitory computer-readable recording medium for storing a base software application to be installed in a machine control computer communicatably connected to a machine, together with an operation software application, the base software application enabling the machine control computer to execute the steps of:

receiving first machine information in a data format specific to the machine outputted from the machine to the machine control computer;

transmitting second command information in the data format specific to the machine to the machine;

inputting first command information in a data format specific to the operation software application from the operation software application;

outputting second machine information in the data format specific to the operation software application to the operation software application;

storing the first machine information, the second machine information, the first command information, and the second command information in a memory unit included in the machine control computer;

identifying a data model corresponding to the machine from the memory unit based on identification information of the machine associated with the first command information;

converting the first machine information into the second machine information based on the identified data model; and converting the first command information into the second command information based on the identified data model, wherein the machine has functions of outputting a state of the machine to the machine control computer as the first machine information, and determining an operation to be performed by the machine based on the second command information, and wherein the operation software application is a program to enable the machine control computer to generate the first command information for the machine based on the second machine information.

44. A machine control method for controlling at least one machine by a machine control computer having a base software application and an operation software application installed therein, the machine control method comprising the following steps performed by the machine control computer:

receiving first machine information in a data format specific to the machine outputted from the machine to the machine control computer;

outputting second machine information in a data format specific to the operation software application to the operation software application;

storing the first machine information and the second machine information in a memory unit included in the machine control computer;

identifying a data model corresponding to the machine from the memory unit based on identification information of the machine associated with the first machine information;

converting the first machine information into the second machine information based on the identified data model; and outputting the second machine information to the operation software application as input information, wherein the machine has a function of outputting a state of the machine to the machine control computer as the first machine information.

45. A machine control method for controlling at least one machine by a machine control computer having a base software application and an operation software application installed therein, the machine control method comprising the following steps performed by the machine control computer:

receiving first machine information in a data format specific to the machine outputted from the machine to the machine control computer;

transmitting second command information in the data format specific to the machine to the machine;

inputting first command information in a data format specific to the operation software application from the operation software application;

outputting the second machine information in the data format specific to the operation software application to the operation software application;

storing the first machine information, the second machine information, the first command information, and the second command information in a memory unit included in the machine control computer;

identifying a data model corresponding to the machine from the memory unit based on identification information of the machine associated with the first command information;

converting the first machine information into the second machine information based on the identified data model; and converting the first command information into the second command information based on the identified data model, wherein the machine has functions of outputting a state of the machine to the machine control computer as the first machine information, and determining an operation to be performed by the machine based on the second command information, and wherein the operation software application is a program to enable the machine control computer to generate the first command information for the machine based on the second machine information.

\* \* \* \* \*